United States Patent
Inagaki et al.

(10) Patent No.: US 6,720,365 B2
(45) Date of Patent: Apr. 13, 2004

(54) ADDITIVE FOR RESIN, ADDITIVE-CONTAINING RESIN, AND METHOD FOR PRODUCING THE SAME

(75) Inventors: Yasuhito Inagaki, Kanagawa (JP); Yuko Fujihira, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/983,585

(22) Filed: Oct. 25, 2001

(65) Prior Publication Data

US 2002/0103273 A1 Aug. 1, 2002

(30) Foreign Application Priority Data

Oct. 27, 2000 (JP) ........................... 2000-319105
Oct. 27, 2000 (JP) ........................... 2000-329106
Oct. 27, 2000 (JP) ........................... 2000-329107

(51) Int. Cl.$^7$ .............. C08K 5/09; C08K 5/12
(52) U.S. Cl. ..................... 523/124; 524/299
(58) Field of Search ................ 523/124; 524/299

(56) References Cited

FOREIGN PATENT DOCUMENTS

| EP | 589 367 | 3/1994 |
|---|---|---|
| JP | 52074646 A | 6/1977 |
| JP | 3237154 A | 10/1991 |
| JP | 9296116 A | 11/1997 |
| SU | 994494 | 2/1983 |

OTHER PUBLICATIONS

XP00219707, Database WPI, Section Ch, Week 199350, Derwent Publications Ltd., London, CN 1 068 836, Feb. 10, 1993 (abstract only).

XP00219708, Database WPI, Section Ch, Week 1999320 Derwent Publications Ltd., London, SU 1 735 325, May 23, 1992 (abstract only).

XP00219709, Database WPI, Section Ch, Week 197731, Derwent Publications Ltd., London, JP 52 074646 Jun. 22, 1977 (abstract only).

Primary Examiner—Kriellion A. Sanders
(74) Attorney, Agent, or Firm—Rader, Fishman & Grauer PLLC; Ronald P. Kananen

(57) ABSTRACT

To provide a plastic material suitable for preservation of the environment and a method for producing the same by adding organic or inorganic sludge to a resin derived from waste plastics to form a flame-retarded resin, an antistatic resin, or a biodegradable resin so that the electrical and physical properties of the resin are improved and sludge and waste plastics are effectively utilized.

5 Claims, No Drawings

ADDITIVE FOR RESIN, ADDITIVE-CONTAINING RESIN, AND METHOD FOR PRODUCING THE SAME

CROSS REFERENCES TO RELATED APPLICATIONS

The present document is based on Japanese Priority Documents JP 2000-329105, 2000-329106 and 2000-329107, all filed in the Japanese Patent Office on Oct. 27, 2000, the entire contents of which being incorporated herein by reference.

BACKGROUND OF THE INVENTION

1. Field of the Invention

The present invention relates to, for example, a flame retardant for resin for imparting flame retardancy to a resin, a flame-retarded resin containing the flame retardant for resin, and a method for imparting flame retardancy to a resin. In addition, the present invention relates to, for example, an antistatic agent for resin for imparting antistatic properties to a resin, an antistatic resin containing the antistatic agent for resin, and a method for imparting antistatic properties to a resin. Further, the present invention relates to, for example, a biodegradable resin composition having biodegradability, and a biodegradable-resin shaped article obtained by shaping the biodegradable resin composition, and a method for producing the same.

2. Description of the Related Art

There is a tendency that sludge and waste plastics discharged increase with years. However, the sludge and waste plastics are mainly disposed of by landfilling and incinerating, and thus now most of them are not utilized effectively.

On the other hand, in products in various fields, such as household electric appliances, a large amount of plastics are used from the viewpoint of achieving the reduction in weight and price of the products and improving the processability during the production therefor. For improving the safety of products made of plastics, it is essential to impart flame retardancy to plastics, and further, for securing and improving the safety and reliability of the products, it is essential to impart antistatic properties to plastics.

Further, plastics are widely used in various products, such as containers, packaging materials, household utensils, agricultural tools and materials, building materials for houses, and parts for automobiles and household electric appliances.

A plastic has such excellent properties that the weight is small, the strength is high, and the processability is good; however, it has problems that waste ones after use are bulky and therefore cause a lack of ground for their disposal, and that they are almost not decomposed after being buried.

As environmental problems are recently being emphasized, for solving the above problems, a biodegradable resin is attracting attention as a material reducing the environmental burden (i.e., material which can return to earth).

SUMMARY OF THE INVENTION

As mentioned above, the sludge and waste plastics are generally disposed of by landfilling and incinerating. However, a technique which substitutes for these disposal methods is desired for the reasons that ground for landfilling the sludge and waste plastics is lacking and that dioxins or the like are generated upon incinerating them.

In addition, in recent years, environmental problems including the above-mentioned problems of waste are being emphasized, and hence techniques of effectively utilizing waste products are needed worldwide.

On the other hand, for imparting flame retardancy to a plastic material, a flame retardant is generally added to a plastic. However, as the flame retardant to be added, a relatively expensive material is needed, and therefore a technique which can effectively impart flame retardancy to a plastic material at lower cost is desired.

In view of the above-mentioned social conditions and problems accompanying the conventional techniques, the present invention achieves the effective utilization of sludge and waste plastics and provides a flame retardant for resin having excellent effect of imparting flame retardancy to a resin (hereinafter, frequently referred to as "flame-retardancy imparting effect"), a flame-retarded resin containing the above flame retardant for resin, and a method for imparting flame retardancy to a resin (hereinafter, frequently referred to as "flame-retardancy imparting method").

On the other hand, for imparting antistatic properties to a plastic material, an antistatic agent is generally added to a plastic. However, as the antistatic agent to be added, a relatively expensive material is needed, and therefore a technique which can effectively impart antistatic properties to a plastic material at lower cost is desired.

Further, the above-mentioned conventional biodegradable resin is expensive and poor in performance, especially in mechanical properties, such as an impact resistance, flame retardancy, and antistatic properties, as compared to general synthetic non-biodegradable plastics. Such disadvantages are fatal problems that prevent the demands of biodegradable resins from increasing.

On the other hand, sludge constitutes the largest amount of general waste and industrial waste, and the sludge discharged increases with the years. Part of the sludge discharged is utilized as compost, but most of the sludge is disposed of by landfilling and incinerating, and thus now is not utilized effectively. In recent years, environmental problems including the above-mentioned problems of waste are being emphasized, and hence techniques of effectively utilizing the sludge discharged are needed worldwide.

In view of the above-mentioned social conditions and problems accompanying the conventional techniques, the present invention also achieves the effective utilization of sludge and also provides a biodegradable resin composition and a biodegradable-resin shaped article each having more excellent performance than that of a conventional biodegradable resin, and a method for producing the same.

The present inventor has made extensive and intensive studies with a view toward solving the above-mentioned problems. As a result, it has been found that the sludge dried material can be used as a flame retardant for resin having excellent flame-retardancy imparting effect for various resins, and thus the present invention has been completed.

Specifically, the flame retardant for resin of the present invention comprises a sludge component.

The flame-retarded resin of the present invention comprises a resin component and a flame retardant for resin, wherein the flame retardant comprises a sludge component.

The term "sludge component" used in the present invention means a component of sludge.

For example, as the sludge component, the flame retardant comprises an inorganic sludge component, preferably comprises, as the sludge component, at least one element selected from the group consisting of aluminum, calcium, iron, silicon, magnesium, titanium, antimony, chlorine, and fluorine.

In the present specification, sludge which comprises a sludge component comprised mainly of an inorganic substance is referred to as "inorganic sludge", and the term "inorganic sludge component" means a component of the inorganic sludge.

For example, as the sludge component, the flame retardant comprises an organic sludge component, preferably comprises, as the sludge component, at least one element selected from the group consisting of phosphorus and nitrogen.

In the present specification, sludge which comprises a sludge component comprised mainly of an organic substance is referred to as "organic sludge", and the term "organic sludge component" means a component of the organic sludge.

For example, the resin component comprises a resin component derived from a waste plastic.

The flame retardant for resin according to the present invention comprises a sludge component, and the sludge contains various substances, for example, inorganic substances, such as various metals, or organic substances containing phosphorus or nitrogen.

Therefore, for example, a resin to which the flame retardant of the present invention is added can be improved in flame retardancy due to the phosphorus or nitrogen contained in the organic sludge obtained from domestic wastewater.

On the other hand, a resin to which the flame retardant obtained by adding inorganic sludge to a resin component is added can be improved in flame retardancy due to the metal component in the form of oxide, hydroxide, or halide contained in the inorganic sludge.

Further, by using a resin component derived from a waste plastic as the resin component, not only can the waste discharged be reduced, but also the effective utilization of waste can be achieved, thus making it possible to contribute to the preservation of the environment.

Further, the method for imparting flame retardancy to a resin of the present invention comprises adding to a resin component a flame retardant for resin comprising a sludge component to impart flame retardancy to a resin.

For example, the resin component comprises a resin component derived from a waste plastic.

For example, as the flame retardant for resin, a flame retardant for resin comprising an inorganic sludge component is added, and preferably, a flame retardant for resin comprising an inorganic sludge component containing at least one element selected from the group consisting of aluminum, calcium, iron, silicon, magnesium, titanium, antimony, chlorine, and fluorine is added.

For example, as the flame retardant for resin, a flame retardant for resin comprising an organic sludge component is added, and preferably, a flame retardant for resin comprising an organic sludge component containing at least one element selected from the group consisting of phosphorus and nitrogen is added.

By the flame-retardancy imparting method for a resin of the present invention, not only can sludge which has been discharged as waste be effectively utilized, but also a resin having flame retardancy can be obtained while achieving a reduction of the cost.

In addition, by using a resin component derived from a waste plastic as the resin component, not only can the waste discharged be reduced, but also the effective utilization of waste can be achieved, thus making it possible to contribute to the preservation of the environment.

Furthermore, it has been found that a component obtained from sludge can be used as an antistatic agent for resin having excellent effect of imparting antistatic properties to various resins (hereinafter, frequently referred to as "antistatic-properties imparting effect"), and thus the present invention has been completed.

Specifically, the antistatic agent for resin of the present invention comprises a sludge component.

The antistatic resin of the present invention comprises a resin component and an antistatic agent for resin, wherein the antistatic agent comprises a sludge component.

The term "sludge component" used in the present invention means a component contained in sludge.

For example, as the sludge component, the antistatic agent for resin contains a metal salt.

In addition, for example, as the sludge component, the antistatic agent for resin comprises at least one element selected from the group consisting of aluminum, calcium, iron, silicon, magnesium, and titanium.

Further, for example, the resin component comprises a resin component derived from a waste plastic.

In the present invention, the antistatic agent comprises a sludge component containing various substances in a large amount. Therefore, for example, a resin to which the antistatic agent obtained by adding to a resin sludge obtained from industrial wastewater is added can be improved in antistatic properties due to the metal component in the form of oxide, hydroxide, or halide contained in the sludge.

In addition, by using a resin component derived from a waste plastic as the resin component, not only can the waste discharged be reduced, but also the effective utilization of waste can be achieved, thus making it possible to contribute to the preservation of the environment.

Further, for attaining the above object, the method for imparting antistatic properties to a resin (hereinafter, frequently referred to as "antistatic-properties imparting method") of the present invention comprises adding to a resin component an antistatic agent for resin comprising a sludge component to impart antistatic properties to a resin.

For example, the resin component comprises a resin component derived from a waste plastic.

In addition, for example, as the antistatic agent for resin, an antistatic agent for resin comprising a sludge component containing a metal salt is added.

Further, for example, as the antistatic agent for resin, an antistatic agent for resin comprising a sludge component which contains at least one element selected from the group consisting of aluminum, calcium, iron, silicon, magnesium, and titanium is added.

By the antistatic-properties imparting method for a resin of the present invention, not only can sludge which has been discharged as waste be effectively utilized, but also a resin having antistatic properties can be obtained while achieving a reduction of the cost.

In addition, by using a resin component derived from a waste plastic as the resin component, not only can the waste discharged be reduced, but also the effective utilization of waste can be achieved, thus making it possible to contribute to the preservation of the environment.

Further, it has been found that, by adding a sludge component to a biodegradable resin, the performance of the biodegradable resin can be improved, and thus the present invention has been completed.

Specifically, the biodegradable resin composition and biodegradable-resin shaped article obtained by shaping the above biodegradable resin composition of the present invention individually comprise a sludge component, and a resin component which contains a biodegradable resin.

For example, as the sludge component, each of the biodegradable resin composition and the shaped article comprises an inorganic sludge component, preferably, comprises, as the sludge component, at least one element selected from the group consisting of aluminum, calcium, iron, silicon, magnesium, titanium, antimony, chlorine, and fluorine.

In the present specification, sludge which comprises a sludge component comprised mainly of an inorganic substance is referred to as "inorganic sludge", and the term "inorganic sludge component" means a component of the inorganic sludge.

For example, as the sludge component, each of the biodegradable resin composition and the shaped article comprises an organic sludge component, preferably comprises, as the sludge component, at least one element selected from the group consisting of a fiber component, phosphorus, and nitrogen.

In the present specification, sludge which comprises a sludge component comprised mainly of an organic substance is referred to as "organic sludge", and the term "organic sludge component" means a component of the organic sludge.

In the present invention, as the components, each of the biodegradable resin composition and the biodegradable-resin shaped article comprises a sludge component and a resin component which contains a biodegradable resin.

The sludge contains various substances, for example, inorganic substances, such as various metals, or organic substances, such as a fiber component.

Therefore, for example, the organic sludge obtained from domestic wastewater generally contains a fiber component, and hence, when such organic sludge is mixed into a resin component, such as a biodegradable resin, the resin can be improved in mechanical properties, for example, impact resistance.

In addition, the biodegradability and flame retardancy of the biodegradable resin composition can be improved due to the phosphorus or nitrogen contained in the organic sludge.

On the other hand, the resin composition obtained by adding inorganic sludge to a resin component can be improved in not only mechanical properties including a Young's modulus but also flame retardancy and antistatic properties due to the metal component in the form of oxide, hydroxide, or halide contained in the inorganic sludge.

In addition, the method for producing a biodegradable resin composition according to the present invention comprises adding a sludge component to a resin component which contains a biodegradable resin to form a biodegradable resin composition.

Further, the method for producing a biodegradable-resin shaped article of the present invention comprises the steps of: adding a sludge component to a resin component which contains a biodegradable resin to form a biodegradable resin composition; and shaping the biodegradable resin composition.

For example, in the step of adding the sludge component to the resin component, an inorganic sludge component is added, and preferably, an inorganic sludge component containing at least one element selected from the group consisting of aluminum, calcium, iron, silicon, magnesium, titanium, antimony, chlorine, and fluorine is added.

For example, in the step of adding the sludge component to the resin component, an organic sludge component is added, and preferably, an organic sludge component containing at least one element selected from the group consisting of a fiber component, phosphorus, and nitrogen is added.

Preferably, before the step of adding the sludge component to the resin component, the method further comprises drying the sludge component to form a sludge dried material, and in the step of adding the sludge component to the resin component, the sludge dried material formed is added as the sludge component.

By the method of the present invention, not only can sludge which has been discharged as waste be effectively utilized, but also a biodegradable resin composition and a biodegradable-resin shaped article each having excellent performance can be obtained while achieving a reduction of the cost.

DETAILED DESCRIPTION OF THE PREFERRED EMBODIMENTS

Hereinbelow, preferred embodiments of the flame retardant for resin, flame-retarded resin, and flame-retardancy imparting method for a resin of the present invention will be described.

As mentioned above, the flame retardant for resin of the present invention comprises a sludge component. For example, the flame retardant for resin of the present invention is obtained by drying sludge.

The term "sludge" used in the present invention means semi liquid waste caused in treatments, e.g., cleaning of various industrial wastewater or domestic wastewater.

Examples of sludge from various industrial wastewater include one which is obtained from various industrial wastewater caused in electrical and electronics industries including manufacturing of semiconductors, an automobile industry, metal industries, such as an iron industry, a paper industry, a chemical industry, a pharmaceutical industry, and a civil engineering and construction industry.

The sludge originally contains various elements in the form of, for example, a compound, but, in the wastewater disposal, an inorganic flocculating agent, such as aluminum sulfate, iron (II) chloride, iron (III) chloride, or polyaluminum chloride (PAC), is generally used, and therefore even more elements or their compounds are contained in the sludge.

For example, the sludge obtained from various industrial wastewater, of which sludge components vary depending on the type of the industry, contains, for example, at least one element selected from the group consisting of aluminum, calcium, iron, silicon, magnesium, titanium, antimony, phosphorus, nitrogen, chlorine, and fluorine in the form of oxide, hydroxide, halide, sulfate, or carbonate, and such compounds have conventionally been used as a flame retardant and thus largely contribute to imparting of flame retardancy to a resin.

In addition, for example, the sludge obtained from domestic wastewater contains phosphorus derived from components including a detergent, and nitrogen, and these elements also largely contribute to imparting of flame retardancy to a resin.

In the present specification, sludge which comprises a sludge component comprised mainly of an inorganic substance is referred to as "inorganic sludge", and sludge which comprises a sludge component comprised mainly of an organic substance is referred to as "organic sludge".

It is considered that the above-mentioned sludge obtained from domestic wastewater mainly belongs to the organic sludge, and the above-mentioned sludge obtained from industrial wastewater mainly belongs to the inorganic sludge.

With respect to each of the contents of aluminum, calcium, iron, silicon, magnesium, titanium, antimony, phosphorus, nitrogen, chlorine, fluorine, and compounds thereof in the sludge component, there is no particular limitation, but generally, each content is preferably 0.01% by weight or more, more preferably 1% by weight or more. When the content is too small, the flame-retardancy imparting effect for resins is low.

The sludge can be solely used as a flame retardant for resin, but a mixture of two or more types of sludge can also be used as a flame retardant for resin.

The above-mentioned sludge is, for example, dried and then added to a resin to produce a flame-retarded resin of the present invention, which comprises a resin component and a flame retardant for resin comprising a sludge component.

For example, the amount of the sludge component added is generally 0.01 to 300% by weight, preferably 0.2 to 100% by weight, more preferably 1 to 50% by weight, in a dry state, based on the weight of the resin. When the amount of the sludge component added is too small, the flame-retardancy imparting effect for resins is low. On the other hand, when the amount is too large, excellent properties, such as excellent moldability and high impact resistance, inherent in the resin are disadvantageously deteriorated.

Examples of resins which can have flame retardancy by addition of the above-mentioned sludge dried material include polystyrene (PS), high-impact polystyrene (HIPS), styrene-acrylonitrile (SAN) resins, acrylonitrile-butadiene-styrene (ABS) resins, polyacrylonitrile (PAN) resins, nylon resins, polyolefin (such as polyethylene, polypropylene, and polyisoprene) resins, polyphenylene ether (PPE), polyphenylene sulfide, polyacrylonitrile-butadiene (nitrile rubbers), polycarbonate (PC), polyethylene terephthalate (PET), polybutylene terephthalate (PBT), polysulfone, polyallylsulfone, polyethersulfone, polythioethersulfone, polyether ketone, polyetherimide, polyether ether ketone, polyamide, polyamideimide, polyimide, polyallylate, aromatic polyester, polyurethane, polyvinyl chloride, chlorinated polyether, polychloromethylstyrene, cellulose, polyvinyl alcohol, chitin, polylactic acid, polylactide, polyacrylate, polymethacrylate, celluloid, polyethylene oxide (PEO), epoxy resins, phenolic formalin resins, melamine resins, amber resins, terpene resins, and various liquid crystalline polymers.

As the resin component to which the flame retardant for resin of the present invention is added, the above-mentioned resins may be used individually, and a mixture of two or more of the above resins in an arbitrary ratio may also be used.

The term "mixture" used in the present specification generally means a multi-component material containing two or more resins, such as a polymer alloy, and includes not only a mixture obtained by merely mixing resins together but also a mixture obtained by dispersing resins, which are inherently immiscible with each other, using a chemical treatment.

Further, the resin may be either a thermoplastic resin or a thermosetting resin.

The resin may be either a virgin resin or a used scrap resin. From the viewpoint of achieving the effective utilization of scrap resins, it is more preferred that a used resin is used as a raw material.

Further, in the flame-retarded resin of the present invention, if desired, an additive for resin, which is generally incorporated into a resin, such as carbon black, can be added as long as processability, such as a kneading property and moldability, of the resin is not sacrificed.

Examples of the above-mentioned additives for resin include flame retardants, such as aluminum hydroxide, antimony oxide, chlorine flame retardants, bromine flame retardants, and phosphorus flame retardants; antistatic agents; coloring agents, such as pigments and dyes; antioxidants, such as phenolic antioxidants, phosphorus antioxidants, and sulfur antioxidants; plasticizers, such as phthalate, fatty acid plasticizers, phosphoric acid plasticizers, and polyester plasticizers; heat stabilizers, such as phosphate, epoxy compounds, polyol, perchlorate, zeolite, and hydrotalcite; hindered amine light stabilizers; reinforcing fibers, such as glass fiber and carbon fiber; inorganic filler, such as calcium carbonate and talc; reinforcements, such as polytetrafluoroethylene (PTFE) powder; ultraviolet absorbers; compatibilizers; surface treating agents; and modifiers.

By the flame retardant for resin according to the present embodiment, a resin can be improved in flame retardancy due to the phosphorus or nitrogen contained in the organic sludge obtained from domestic wastewater.

On the other hand, by adding inorganic sludge to a resin, the resin can be improved in flame retardancy due to the metal component in the form of oxide, hydroxide, or halide contained in the inorganic sludge.

Therefore, a flame retardant for resin having excellent flame-retardancy imparting effect can be obtained effectively utilizing sludge which has conventionally been discharged as waste. In addition, the flame retardant for resin of the present invention can be applied to used resins, for example, used expanded polystyrene, thus making it possible to contribute to the effective utilization of waste plastics.

Further, the present invention can not only provide a flame retardant for resin having excellent flame-retardancy imparting effect and a resin having excellent flame retardancy obtained by adding to a resin the above flame retardant for resin but also reduce the waste discharged and achieve the effective utilization of waste, thus making it possible to contribute to the preservation of the environment.

Next, the method for producing a flame retardant for resin and a flame-retarded resin (method for imparting flame retardancy to a resin) of the present invention will be described.

First, the components of the sludge obtained from wastewater caused in various plants and domestic wastewater are analyzed to determine at least one sludge which can be advantageously used in the method of the present invention. In this case, taking into consideration the fact that the resultant flame retardant, flame-retarded resin, and shaped article of the flame-retarded resin which individually contain the sludge will be returned to earth after being used, it is preferred that sludge containing a harmful substance, such as mercury or arsenic, in an amount as small as possible is used.

The sludge obtained from various industrial wastewater generally has a mixture content of 70 to 80%. Therefore, when such sludge is mixed into a resin, the sludge is dried by heating by hot-air drying or using a rotary kiln, vacuum, freezing, burning, or sunlight to produce a sludge dried material.

In this case, when the sludge is dried at too high a temperature, the sludge is disadvantageously blackened by carbonization or the like. Therefore, it is preferred that the sludge is dried at a temperature as low as possible. For example, the sludge is dried preferably at a temperature lower than the shaping temperature for a resin, more preferably at a temperature 20° C. or more lower than the shaping temperature for a resin.

Thus, the sludge dried material is produced as a flame retardant for resin of the present invention.

Then, when a flame retardant for resin comprising the above-mentioned sludge dried material is added to a resin to produce a flame-retarded resin, if desired, the sludge dried material is ground or classified so as to be in a powder form having a small particle diameter and having a narrow particle diameter distribution.

Then, the flame retardant for resin comprising the sludge dried material in a powder form, the predetermined resin, and, if desired, other additive for resin in the predetermined ratio are mixed with each other by a mixing method for a general synthetic resin using a mixer, for example, a two-roll mill, a kneader, an intermix, or a Banbury mixer.

Thus, a flame-retarded resin comprising the sludge dried material as a flame retardant for resin is produced.

When a resin shaped article is produced from the obtained flame-retarded resin, for example, among various shaping methods, such as compression molding, transfer molding, injection molding, casting, slush molding, vacuum forming, laminate molding, and extrusion, an appropriate shaping method is selected according to the components of the flame-retarded resin obtained by the above-mentioned method and the desired shape for the shaped article, thus obtaining a resin shaped article.

By the flame-retardancy imparting method for a resin according to the present embodiment, not only can sludge which has been discharged as waste be effectively utilized without an additional step for production, but also a resin having flame retardancy can be obtained while achieving a reduction of the cost.

The flame retardant for resin, flame-retarded resin, and flame-retardancy imparting method of the present invention are not limited to the above-described embodiments. For example, as mentioned above, the flame retardant for resin of the present invention can be used in combination with other general flame retardant for resin, in addition to the sludge dried material. In addition, with respect to the degree of drying of the sludge, there is no particular limitation as long as the component of the sludge can be effectively used as a flame retardant for resin.

Further, with respect to the type of the resin, there is no particular limitation as long as the resin can have flame retardancy by addition of the above-mentioned flame retardant for resin.

In addition, various modifications can be made as long as the flame retardant, resin, and method of the present invention can be obtained.

Next, the present invention will be described in more detail with reference to the following Examples. The following Examples show merely preferred embodiments of the present invention, and the amounts of the sludge component added and the types of the resins used can be appropriately changed as long as the flame retardant, resin, and method of the present invention can be obtained.

(Preparation of Flame Retardant 1 for Resin)

Sludge (moisture content: 68%) discharged from a semiconductor plant was dried by means of a vacuum dryer at a pressure of 1.33 kPa (10 Torr) at a temperature of 100° C. for 4 hours to obtain a flame retardant for resin in a gray powder form. As a result of analysis, it has been found that the powder of the obtained flame retardant for resin contains 22% by weight of aluminum, 19% by weight of calcium, 1.0% by weight of magnesium, 8.0% by weight of silicon, and 8.0% by weight of fluorine.

(Preparation of Flame Retardant 2 for Resin)

A dehydrated cake of mixed raw sludge discharged from a sewage disposal plant was dried by means of a vacuum dryer at a pressure of 1.33 kPa (10 Torr) at a temperature of 100° C. for 4 hours to obtain a flame retardant for resin in a pale-brown powder form. As a result of analysis, it has been found that the powder of the obtained flame retardant for resin contains 8.0% by weight of aluminum, 3.1% by weight of phosphorus, 15.8% by weight of silicon, 3.2% by weight of nitrogen, and 5.3% by weight of chlorine.

(Preparation of Flame Retardant 3 for Resin)

Sludge (moisture content: 62%) discharged from a chemical plant was dried by means of a vacuum dryer at a pressure of 1.33 kPa (10 Torr) at a temperature of 100° C. for 4 hours to obtain a flame retardant for resin in a powder form. As a result of analysis, it has been found that the powder of the obtained flame retardant for resin contains 12% by weight of aluminum, 5.8% by weight of antimony, 9.0% by weight of iron, and 4.0% by weight of titanium.

EXAMPLE 1

The flame retardant 1 for resin was mixed in an amount of 20% by weight into an ABS resin, and the resultant mixture was subjected to hot pressing at 250° C. for 10 minutes to obtain a resin plate in a sheet form.

EXAMPLE 2

The flame retardant 3 for resin was mixed in an amount of 15% by weight into a high-impact polystyrene (HIPS) resin, and the resultant mixture was subjected to hot pressing at 250° C. for 10 minutes to obtain a resin plate in a sheet form.

EXAMPLE 3

The flame retardant 2 for resin and the flame retardant 3 for resin were added in a respective amount of 10% by weight to a phenolic resin (material for printed board) to obtain a resin plate in a sheet form.

EXAMPLE 4

The flame retardant 1 for resin and the flame retardant 2 for resin were mixed in a respective amount of 10% by weight into a polycarbonate (PC) resin, and the resultant mixture was subjected to hot pressing at 280° C. for 10 minutes to obtain a resin plate in a sheet form.

EXAMPLE 5

The flame retardant 3 for resin was mixed in an amount of 15% by weight into a polypropylene (PP) resin, and the resultant mixture was subjected to hot pressing at 250° C. for 10 minutes to obtain a resin plate in a sheet form.

EXAMPLE 6

The flame retardant 1 for resin was mixed in an amount of 20% by weight into a used expanded polystyrene (polystyrene; PS) resin, and the resultant mixture was subjected to hot pressing 250° C. for 10 minutes to obtain a resin plate in a sheet form.

EXAMPLE 7

The flame retardants 1 to 3 for resin were added in a respective amount of 8% by weight to a glass epoxy resin (material for printed board) to obtain a resin plate in a sheet form.

Comparative Examples 1 to 7

In Comparative Examples 1 to 7, the same resins as those respectively used in Examples 1 to 7 were individually processed and shaped under substantially the same conditions as those respectively used in Examples 1 to 7 except that no flame retardant for resin was added to obtain resin plates in a sheet form.

With respect to each of the resin plates obtained in Examples 1 to 7 and Comparative Examples 1 to 7, flame retardancy was evaluated in accordance with the Underwriters Laboratories Subject 94 (UL-Subject 94), and the results are shown in Table 1.

In the UL-Subject 94, 5V, V-0, V-1, V-2, and HB designate the levels of flame retardancy in descending order.

TABLE 1

| Example | Flame retardancy | Comparative Example | Flame retardancy |
|---------|------------------|---------------------|------------------|
| 1 | HB | 1 | HB or less |
| 2 | HB | 2 | HB or less |
| 3 | V-O | 3 | V-1 |
| 4 | V-O | 4 | V-1 |
| 5 | HB | 5 | HB or less |
| 6 | HB | 6 | HB or less |
| 7 | V-O | 7 | V-1 |

As can be seen from Table 1, it has been confirmed that the resin containing a flame retardant for resin comprising a sludge dried material is improved in flame retardancy, as compared to the resin containing no flame retardant.

Although not shown in the table, it has been confirmed that, when a conventional flame retardant for resin, for example, aluminum hydroxide is added to the sludge dried material, the flame-retardancy imparting effect for resins is further enhanced.

Thus, by the present invention, a flame retardant for resin having excellent flame-retardancy imparting effect and a flame-retarded resin having excellent flame retardancy can be obtained effectively utilizing sludge which has conventionally been discharged as waste.

Further, the present invention can not only provide a flame retardant for resin having excellent flame-retardancy imparting effect and a flame-retarded resin having excellent flame retardancy but also reduce the waste discharged and achieve the effective utilization of waste, thus making it possible to contribute to the preservation of the environment.

Next, preferred embodiments of the antistatic agent for resin, antistatic resin, and antistatic-properties imparting method for a resin of the present invention will be described in detail.

The antistatic agent for resin of the present invention comprises a sludge component. For example, the antistatic agent for resin of the present invention is obtained by drying sludge.

The term "sludge" used in the present invention means semi liquid waste caused in treatments, e.g., cleaning of various industrial wastewater or domestic wastewater, as in the above-described embodiment.

Examples of sludge from various industrial wastewater include one which is obtained from various industrial wastewater caused in electrical and electronics industries including manufacturing of semiconductors, an automobile industry, metal industries, such as an iron industry, a paper industry, a chemical industry, a pharmaceutical industry, and a civil engineering and construction industry.

In the present specification, sludge which comprises a sludge component comprised mainly of an inorganic substance is referred to as "inorganic sludge", and sludge which comprises a sludge component comprised mainly of an organic substance is referred to as "organic sludge", as mentioned in the above description.

It is considered that the above-mentioned sludge obtained from domestic wastewater mainly belongs to the organic sludge, and the above-mentioned sludge obtained from industrial wastewater mainly belongs to the inorganic sludge.

The inorganic sludge originally contains various elements in the form of, for example, compound, but, in the wastewater disposal, an inorganic flocculating agent, such as aluminum sulfate, iron (II) chloride, iron (III) chloride, or polyaluminum chloride (PAC), is generally used, and therefore even more elements or their compounds are contained in the inorganic sludge.

For example, the inorganic sludge obtained from various industrial wastewater, of which sludge components vary depending on the type of the industry, contains, for example, at least one inorganic substance selected from the group consisting of aluminum, calcium, iron, silicon, magnesium, and titanium in the form of oxide, hydroxide, halide, sulfate, or carbonate, and such compounds largely contribute to imparting of antistatic properties to a resin.

In addition, for example, the sludge obtained from domestic wastewater, which sludge contains an inorganic substance, can also be used as an antistatic agent like the above-mentioned sludge obtained from industrial wastewater.

With respect to each of the contents of metals, such as aluminum, calcium, iron, silicon, magnesium, and titanium, and compounds thereof in the inorganic sludge component, there is no particular limitation, but generally, each content is preferably 0.01% by weight or more, more preferably 1% by weight or more. When the content is too small, the antistatic-properties imparting effect for resins is low.

The inorganic sludge can be solely used as an antistatic agent for resin, but a mixture of two or more types of sludge can also be used as an antistatic agent for resin.

The above-mentioned inorganic sludge is, for example, dried and then added to a resin to produce an antistatic resin of the present invention, which comprises a resin component and an antistatic agent for resin comprising a sludge component.

For example, the amount of the inorganic sludge component added is generally 0.01 to 300% by weight, preferably 0.2 to 100% by weight, more preferably 1 to 50% by weight, in a dry state, based on the weight of the resin. When the amount of the inorganic sludge component added is too small, the antistatic-properties imparting effect for resins is low. On the other hand, when the amount is too large, excellent properties, such as excellent moldability and high impact resistance, inherent in the resin are disadvantageously deteriorated.

Examples of resins which can have antistatic properties by addition of the above-mentioned sludge dried material include polystyrene (PS), high-impact polystyrene (HIPS), styrene-acrylonitrile (SAN) resins, acrylonitrile-butadiene-styrene (ABS) resins, polyacrylonitrile (PAN) resins, nylon resins, polyolefin (such as polyethylene, polypropylene, and polyisoprene) resins, polyphenylene ether (PPE), polyphenylene sulfide, polyacrylonitrile-butadiene (nitrile rubbers), polycarbonate (PC), polyethylene terephthalate (PET), polybutylene terephthalate (PBT), polysulfone, polyallylsulfone, polyethersulfone, polythioethersulfone, polyether ketone, polyetherimide, polyether ether ketone, polyamide, polyamideimide, polyimide, polyallylate, aromatic polyester, polyurethane, polyvinyl chloride, chlorinated polyether, polychloromethylstyrene, cellulose, polyvinyl alcohol, chitin, polylactic acid, polylactide, polyacrylate, polymethacrylate, celluloid, polyethylene oxide (PEO), epoxy resins, phenolic formalin resins, melamine resins, amber resins, terpene resins, and various liquid crystalline polymers.

As the resin component to which the antistatic agent for resin of the present invention is added, the above-mentioned resins may be used individually, and a mixture of two or more of the above resins in an arbitrary ratio may also be used.

The term "mixture" used in the present specification generally means a multi-component material containing two or more resins, such as a polymer alloy, and includes not only a mixture obtained by merely mixing resins together but also a mixture obtained by dispersing resins, which are inherently immiscible with each other, using a chemical treatment.

Further, the resin may be either a thermoplastic resin or a thermosetting resin.

The resin may be either a virgin resin or a used scrap resin. From the viewpoint of achieving the effective utilization of scrap resins, it is more preferred that a used resin is used as a raw material.

Further, in the antistatic resin of the present invention, if desired, an additive for resin, which is generally incorporated into a resin, such as carbon black, can be added as long as processability, such as a kneading property and moldability, of the resin is not sacrificed.

Examples of the above-mentioned additives for resin include antistatic agents; coloring agents, such as pigments and dyes; antioxidants, such as phenolic antioxidants, phosphorus antioxidants, and sulfur antioxidants; flame retardants, such as aluminum hydroxide, antimony oxide, chlorine flame retardants, bromine flame retardants, and phosphorus flame retardants; plasticizers, such as phthalate, fatty acid plasticizers, phosphoric acid plasticizers, and polyester plasticizers; heat stabilizers, such as phosphate, epoxy compounds, polyol, perchlorate, zeolite, and hydrotalcite; hindered amine light stabilizers; reinforcing fibers, such as glass fiber and carbon fiber; inorganic filler, such as calcium carbonate and talc; reinforcements, such as polytetrafluoroethylene (PTFE) powder; ultraviolet absorbers; compatibilizers; surface treating agents; and modifiers.

In the antistatic agent for resin according to the present embodiment, a resin to which the antistatic agent obtained by adding to a resin sludge obtained from industrial wastewater is added can be improved in antistatic properties particularly due to the metal component in the form of oxide, hydroxide, or halide contained in the inorganic sludge.

Therefore, an antistatic agent for resin having excellent antistatic-properties imparting effect can be obtained effectively utilizing sludge which has conventionally been discharged as waste. In addition, the antistatic agent for resin of the present invention can be applied to used resins, for example, used expanded polystyrene, thus making it possible to contribute to the effective utilization of waste plastics.

Further, the present invention can not only provide an antistatic agent for resin having excellent antistatic-properties imparting effect and an antistatic resin obtained by adding to a resin the above antistatic agent for resin but also reduce the waste discharged and achieve the effective utilization of waste, thus making it possible to contribute to the preservation of the environment.

Next, the method for producing an antistatic agent for resin and an antistatic resin (method for imparting antistatic properties to a resin) of the present invention will be described.

First, the components of the sludge obtained from wastewater caused in various plants and domestic wastewater are analyzed to determine at least one inorganic sludge which can be advantageously used in the method of the present invention. In this case, taking into consideration the fact that the resultant antistatic agent for resin, antistatic resin, and shaped article of the antistatic resin which individually contain the inorganic sludge will be returned to earth after being used, it is preferred that sludge containing a harmful substance, such as mercury or arsenic, in an amount as small as possible is used.

The inorganic sludge obtained from industrial wastewater generally has a moisture content of 70 to 80%. Therefore, when the inorganic sludge is mixed into a resin, the sludge is dried by heating by hot-air drying or using a rotary kiln, vacuum, freezing, burning, or sunlight to produce an inorganic sludge dried material.

Drying by means of the above rotary kiln is most practical.

Thus, the sludge dried material is produced as the antistatic agent of the present invention.

Then, when an antistatic agent for resin comprising the above-mentioned inorganic sludge dried material is added to a resin to produce an antistatic resin, if desired, the inorganic sludge dried material is ground or classified so as to be in a powder form having a small particle diameter and having a narrow particle diameter distribution.

Then, the antistatic agent for resin comprising the inorganic sludge dried material in a powder form, the predetermined resin, and, if desired, other additive for resin in the predetermined ratio are mixed with each other by a mixing method for a general synthetic resin using a mixer, for example, a two-roll mill, a kneader, an intermix, or a Banbury mixer.

Thus, an antistatic resin comprising the sludge dried material as an antistatic agent for resin is produced.

When a resin shaped article is produced from the obtained antistatic resin, for example, among various shaping methods, such as compression molding, transfer molding, injection molding, casting, slush molding, vacuum forming, laminate molding, and extrusion, an appropriate shaping method is selected according to the components of the antistatic resin obtained by the above-mentioned method and the desired shape for the shaped article, thus obtaining a resin shaped article.

By the antistatic-properties imparting method according to the present embodiment, not only can sludge which has been discharged as waste be effectively utilized without an additional step for production, but also an antistatic resin can be obtained while achieving a reduction of the cost.

The antistatic agent for resin, antistatic resin, and antistatic-properties imparting method of the present invention are not limited to the above-described embodiments. For example, as mentioned above, the antistatic agent for resin of the present invention can be used in combination with other general antistatic agent for resin, in addition to the inorganic sludge dried material. In addition, with respect to the degree of drying of the sludge, there is no particular limitation as long as the component of the inorganic sludge can be effectively used as an antistatic agent for resin.

Further, with respect to the type of the resin, there is no particular limitation as long as the resin can have antistatic properties by addition of the above-mentioned antistatic agent for resin.

In addition, various modifications can be made as long as the antistatic agent, resin, and method of the present invention can be obtained.

Next, the present invention will be described in more detail with reference to the following Examples. The following Examples show merely preferred embodiments of the present invention, and the amounts of the sludge component added and the types of the resins used can be appropriately changed as long as the antistatic agent, resin, and method of the present invention can be obtained.

(Preparation of Antistatic Agent 11 for Resin)

Sludge (moisture content: 70%) discharged from a semiconductor plant was dried by means of a vacuum dryer at a pressure of 1.33 kPa (10 Torr) at a temperature of 100° C. for 4 hours to obtain an antistatic agent for resin in a white powder form. As a result of analysis, it has been found that the powder of the obtained antistatic agent for resin contains 20% by weight of aluminum, 17% by weight of calcium, 1.4% by weight of magnesium, and 10% by weight of silicon.

(Preparation of Antistatic Agent 12 for Resin)

Sludge (moisture content: 60%) discharged from a metal processing plant was dried by means of a vacuum dryer at a pressure of 1.33 kPa (10 Torr) at a temperature of 100° C. for 4 hours to obtain an antistatic agent for resin in a powder form. As a result of analysis, it has been found that the powder of the obtained antistatic agent for resin contains 15% by weight of titanium, 10% by weight of iron, 18% by weight of magnesium, and 13% by weight of aluminum.

EXAMPLE 8

The antistatic agent 11 for resin was mixed in an amount of 20% by weight into an ABS resin, and the resultant mixture was subjected to hot pressing at 250° C. for 10 minutes to obtain a resin plate in a sheet form.

EXAMPLE 9

The antistatic agent 11 for resin was mixed in an amount of 15% by weight into a high-impact polystyrene (HIPS) resin, and the resultant mixture was subjected to hot pressing at 250° C. for 10 minutes to obtain a resin plate in a sheet form.

EXAMPLE 10

The antistatic agent 11 for resin was mixed in an amount of 10% by weight into polylactic acid which is a biodegradable plastic, and the resultant mixture was subjected to hot pressing at 150° C. for 10 minutes to obtain a resin plate in a sheet form.

EXAMPLE 11

The antistatic agent 11 for resin was added in an amount of 15% by weight to a phenolic resin (material for printed board) to obtain a resin plate in a sheet form.

EXAMPLE 12

The antistatic agent 12 for resin was mixed in an amount of 20% by weight into a polycarbonate (PC) resin, and the resultant mixture was subjected to hot pressing at 280° C. for 10 minutes to obtain a resin plate in a sheet form.

EXAMPLE 13

The antistatic agent 12 for resin was mixed in an amount of 15% by weight into a polypropylene (PP) resin, and the resultant mixture was subjected to hot pressing at 250° C. for 10 minutes to obtain a resin plate in a sheet form.

EXAMPLE 14

The antistatic agent 12 for resin was mixed in an amount of 10% by weight into a used expanded polystyrene (polystyrene; PS) resin, and the resultant mixture was subjected to hot pressing at 250° C. for 10 minutes to obtain a resin plate in a sheet form.

EXAMPLE 15

The antistatic agent 12 for resin was added in an amount of 10% by weight to a glass epoxy resin (material for printed board) to obtain a resin plate in a sheet form.

Comparative Examples 8 to 15

In Comparative Examples 8 to 15, the same resins as those respectively used in Examples 1 to 8 were individually processed and shaped under substantially the same conditions as those respectively used in Examples 1 to 8 except that no antistatic agent for resin was added to obtain resin plates in a sheet form.

With respect to each of the resin plates obtained in Examples 8 to 15 and Comparative Examples 8 to 15, a surface resistance was measured by means of a surface resistance meter (YOKOGAWA-HEWLETT-PACKARD 4329 A HIGH RESISTANCE METER; at 500V, after 30 seconds), and the results are shown in Table 2.

TABLE 2

| Example | Surface resistance ($\Omega$) | Comparative Example | Surface resistance ($\Omega$) |
| --- | --- | --- | --- |
| 8 | $2.8 \times 10^{12}$ | 8 | $>1 \times 10^{16}$ |
| 9 | $1 \times 10^{13}$ | 9 | $>1 \times 10^{16}$ |
| 10 | $5 \times 10^{13}$ | 10 | $1 \times 10^{15}$ |
| 11 | $2 \times 10^{12}$ | 11 | $1 \times 10^{14}$ |
| 12 | $4 \times 10^{12}$ | 12 | $>1 \times 10^{15}$ |
| 13 | $2 \times 10^{12}$ | 13 | $>1 \times 10^{15}$ |
| 14 | $2 \times 10^{13}$ | 14 | $6 \times 10^{15}$ |
| 15 | $1 \times 10^{14}$ | 15 | $>1 \times 10^{16}$ |

As can be seen from Table 2, it has been confirmed that the surface resistance of the resin containing an antistatic agent for resin comprising an inorganic sludge dried material is lowered and the antistatic properties of the above resin are improved, as compared to those of the resin containing no antistatic agent.

Although not shown in the table, it has been confirmed that, when a conventional antistatic agent for resin is added to the inorganic sludge dried material, the antistatic-properties imparting effect for resins is further enhanced.

Thus, by the present invention, an antistatic agent for resin having excellent antistatic-properties imparting effect and an antistatic resin having excellent antistatic properties can be obtained effectively utilizing sludge which has conventionally been discharged as waste.

Further, the present invention can not only provide an antistatic agent for resin having excellent antistatic-properties imparting effect and an antistatic resin having excellent antistatic properties but also reduce the waste discharged and achieve the effective utilization of waste, thus making it possible to contribute to the preservation of the environment.

Next, preferred embodiments of the biodegradable resin composition, biodegradable-resin shaped article, and method for producing the same of the present invention will be described in detail.

As mentioned above, the biodegradable resin composition and the resin-biodegradable shaped article individually comprise a sludge component, and a resin component which contains a biodegradable resin.

The term "biodegradable resin" used in the present invention means a resin degradable by microorganisms.

With respect to the biodegradable resin which can be used in the present invention, there is no particular limitation as long as it has the above-mentioned property, and examples include polylactic acid, polyglycolic acid, hydroxyvalerate-butylate copolymers, polybutylene succinate, polycaprolactone, bacterial cellulose, curdlan, pullulan, filamentous fungi, cellulose, aliphatic polyester, proteins, polycaprolactam, poly(-β-)propionlactone, chitin/chitosan, alginic acid, gluten, collagen, polyvinyl alcohol (PVA), polyamino acids {such as poly(-L-)glutamic acid and poly(-L-)lysine}, polyethylene glycol (PEG), polypropylene glycol, celluloid, polylactide, polyurethane, polycarbonate, polyglutamate, and various polyamides.

As the resin component of the biodegradable resin composition of the present invention, the above-mentioned biodegradable resins may be used individually, and a mixture of two or more of the above biodegradable resins in an arbitrary ratio may also be used.

Alternatively, as the resin component of the biodegradable resin composition of the present invention, a mixture of the above-mentioned biodegradable resin and a synthetic non-biodegradable resin may be used.

With respect to the synthetic non-biodegradable resin, there is no particular limitation as long as it is generally used as a material for plastic other than the above-mentioned biodegradable resins, and examples of synthetic non-biodegradable resins include polystyrene (PS), high-impact polystyrene (HIPS), styrene-acrylonitrile (SAN) resins, acrylonitrile-butadiene-styrene (ABS) resins, polyacrylonitrile (PAN) resins, nylon resins, polyolefin (such as polyethylene, polypropylene, and polyisoprene) resins, polyphenylene ether (PPE), polyphenylene sulfide, polyacrylonitrile-butadiene (nitrile rubbers), polycarbonate (PC), polyethylene terephthalate (PET), polybutylene terephthalate (PBT), polysulfone, polyallylsulfone, polyethersulfone, polythioethersulfone, polyether ketone, polyetherimide, polyether ether ketone, polyamide, polyamideimide, polyimide, polyallylate, aromatic polyester, polyurethane, polyvinyl chloride, chlorinated polyether, polychloromethylstyrene, polyacrylate, polymethacrylate, celluloid, epoxy resins, phenolic formalin resins, melamine resins, amber resins, terpene resins, and various liquid crystalline polymers.

As the resin component of the biodegradable resin composition of the present invention, the above-mentioned synthetic non-biodegradable resin may be solely mixed into a biodegradable resin, and a mixture of two or more of the above synthetic non-biodegradable resins may also be mixed into a biodegradable resin in an arbitrary ratio.

The term "mixture" used in the present specification generally means a multi-component material containing two or more resins, such as a polymer alloy, and includes not only a mixture obtained by merely mixing resins together but also a mixture obtained by dispersing resins, which are inherently immiscible with each other, using a chemical treatment.

Each of the biodegradable resin and the synthetic non-biodegradable resin may be either a virgin resin or a used scrap resin. From the viewpoint of achieving the effective utilization of scrap resins, it is more preferred that a used resin is used as a raw material.

With respect to the amount of the biodegradable resin mixed as the resin component, there is no particular limitation, but the biodegradable resin content is generally in the range of from 0.1 to 99.9% by weight.

The term "sludge" used in the present invention means semi liquid waste caused in treatments, e.g., cleaning of various industrial wastewater or domestic wastewater.

Examples of sludge from various industrial wastewater include one which is obtained from various industrial wastewater caused in electrical and electronics industries including manufacturing of semiconductors, an automobile industry, metal industries, such as an iron industry, a paper industry, a chemical industry, a pharmaceutical industry, and a civil engineering and construction industry.

The sludge originally contains various elements in the form of, for example, compound, but, in the wastewater disposal, an inorganic flocculating agent, such as aluminum sulfate, iron(II) chloride, iron(III) chloride, or polyaluminum chloride (PAC), is generally used, and therefore even more elements or their compounds are contained in the sludge.

For example, the sludge obtained from various industrial wastewater, of which sludge components vary depending on the type of the industry, contains, for example, at least one element selected from the group consisting of aluminum, calcium, iron, silicon, magnesium, titanium, antimony, phosphorus, nitrogen, chlorine, and fluorine in the form of oxide, hydroxide, halide, sulfate, or carbonate, and such compounds have conventionally been used as a flame retardant and thus largely contribute to imparting of flame retardancy to a resin.

Metal elements, such as aluminum, calcium, iron, silicon, magnesium, and titanium, contained in the form of oxide, hydroxide, halide, sulfate, or carbonate in the sludge obtained from various industrial wastewater largely contribute to imparting of antistatic properties to a resin.

Further, they also have an effect of improving mechanical properties of the resin, such as a Young's modulus.

In addition, for example, the sludge obtained from domestic wastewater generally contains a fiber component. Therefore, when such sludge is mixed into a resin, such as a biodegradable resin, the resin is improved in mechanical properties, such as an impact resistance.

Further, for example, the sludge obtained from domestic wastewater contains phosphorus derived from components including a detergent, and nitrogen, and a resin to which the sludge containing these elements is added can also be improved in biodegradability and frame retardancy.

In the present specification, sludge which comprises a sludge component comprised mainly of an inorganic substance is referred to as "inorganic sludge", and the term "inorganic sludge component" means a component of the inorganic sludge.

It is considered that the above-mentioned sludge obtained from domestic wastewater mainly belongs to the organic sludge, and the above-mentioned sludge obtained from industrial wastewater mainly belongs to the inorganic sludge.

In the biodegradable resin composition of the present invention, both the above-mentioned organic sludge and inorganic sludge may be mixed into a resin.

For example, the amount of the sludge component added is generally 0.01 to 300% by weight, preferably 0.2 to 100% by weight, more preferably 1 to 50% by weight, in a dry state, based on the weight of the resin. When the amount of the sludge component added is too small, the effect of improving the performance of the biodegradable resin composition is low. On the other hand, when the amount is too large, excellent properties, such as excellent moldability and high impact resistance, inherent in the resin are disadvantageously deteriorated.

It is presumed that the components of the sludge vary depending on the types of plants and the time, and the sludge is appropriately added to a resin taking into consideration of changing of the components of the sludge used.

It is noted that, as a result of actual analysis, for example, the components of the sludge obtained from the same plant are confirmed to be substantially constant.

Further, in the biodegradable resin composition of the present invention, if desired, an additive for resin, which is generally incorporated into a resin, such as carbon black, can be added as long as processability, such as a kneading property and moldability, of the resin is not sacrificed.

Examples of the above-mentioned additives for resin include antistatic agents; coloring agents, such as pigments and dyes; antioxidants, such as phenolic antioxidants, phosphorus antioxidants, and sulfur antioxidants; flame retardants, such as aluminum hydroxide, antimony oxide, chlorine flame retardants, bromine flame retardants, and phosphorus flame retardants; plasticizers, such as phthalate, fatty acid plasticizers, phosphoric acid plasticizers, and polyester plasticizers; heat stabilizers, such as phosphate, epoxy compounds, polyol, perchlorate, zeolite, and hydrotalcite; hindered amine light stabilizers; reinforcing fibers, such as glass fiber and carbon fiber; inorganic filler, such as calcium carbonate and talc; reinforcements, such as polytetrafluoroethylene (PTFE) powder; ultraviolet absorbers; compatibilizers; surface treating agents; and modifiers.

In the biodegradable resin composition according to the present embodiment, the organic sludge obtained from domestic wastewater generally contains a fiber component, and therefore, when such organic sludge is mixed into a resin, such as a biodegradable resin, the resin is improved in mechanical properties, for example, an impact resistance.

Further, the resin can also be improved in biodegradability and frame retardancy due to the phosphorus and nitrogen contained in the organic sludge.

On the other hand, the resin composition obtained by adding inorganic sludge to a resin can be improved in not only mechanical properties, such as a Young's modulus, but also flame retardancy and antistatic properties due to the metal component contained in the form of oxide, hydroxide, or halide in the inorganic sludge.

Therefore, a biodegradable resin composition comprising a biodegradable resin having excellent performance and a resin shaped article of the above biodegradable resin composition can be obtained effectively utilizing sludge which has conventionally been discharged as waste.

Further, the present invention can not only provide a biodegradable resin composition having excellent performance and a shaped article thereof but also reduce the waste discharged and achieve the effective utilization of waste, thus making it possible to contribute to the preservation of the environment.

Next, the method for producing a biodegradable resin composition of the present invention will be described.

First, the components of the sludge obtained from wastewater caused in various plants and domestic wastewater are analyzed to determine at least one sludge which can be advantageously used in the method of the present invention. In this case, taking into consideration the fact that the resultant biodegradable resin composition and resin shaped article of the biodegradable resin composition which individually contain the sludge will be returned to earth after being used, it is preferred that sludge containing a harmful substance, such as mercury or arsenic, in an amount as small as possible is used.

The sludge obtained from various industrial wastewater generally has a mixture content of 70 to 80%. Therefore, when such sludge is mixed into a resin, the sludge is dried by heating by hot-air drying or using a rotary kiln, vacuum, freezing, burning, or sunlight to produce a sludge dried material.

In this case, when the sludge is dried at too high a temperature, the sludge is disadvantageously blackened by carbonization or the like. Therefore, it is preferred that the sludge is dried at a temperature as low as possible. For example, the sludge is dried preferably at a temperature lower than the shaping temperature for a resin, more preferably at a temperature 20° C. or more lower than the shaping temperature for a resin.

Then, when the sludge dried material is added to a biodegradable resin, if desired, the sludge dried material is ground or classified so as to be in a powder form having a small particle diameter and having a narrow particle diameter distribution.

Then, the sludge dried material in a powder form, a biodegradable resin, and, if desired, a synthetic non-biodegradable resin and other additive for resin in the predetermined ratio are mixed with each other by a mixing method for a general synthetic resin using a mixer, for example, a two-roll mill, a kneader, an intermix, or a Banbury mixer.

When a resin shaped article is produced from the obtained biodegradable resin composition, for example, among various shaping methods, such as compression molding, transfer molding, injection molding, casting, slush molding, vacuum forming, laminate molding, and extrusion, an appropriate shaping method is selected according to the components of the biodegradable resin composition obtained by the above-mentioned method and the desired shape for the shaped article, thus obtaining a biodegradable-resin shaped article.

By the method for producing a biodegradable resin composition and a biodegradable-resin shaped article according to the present embodiment, not only can sludge which has been discharged as waste be effectively utilized without an additional step for production, but also a biodegradable resin composition and a biodegradable-resin shaped article each having excellent performance can be obtained while achieving a reduction of the cost.

The biodegradable resin composition, biodegradable-resin shaped article, and method for producing the same of the present invention are not limited to the above-described embodiments. For example, as mentioned above, with respect to the types of the biodegradable resin, synthetic non-biodegradable resin, and additive for resin used in the biodegradable resin composition, there is no particular limitation.

In addition, various modifications can be made as long as the biodegradable resin composition, shaped article, and method of the present invention can be obtained.

Next, the present invention will be described in more detail with reference to the following Examples. The following Examples show merely preferred embodiments of the present invention, and the amounts of the types of the resins used and the sludge component added can be appropriately changed as long as the biodegradable resin composition, shaped article, and method of the present invention can be obtained.

EXAMPLE 16

Sludge (moisture content: 70%) discharged from a semiconductor plant was dried by means of a vacuum dryer at a pressure of 1.33 kPa (10 Torr) at a temperature of 100° C. for 4 hours to obtain a sludge dried material in a white powder form. As a result of analysis, it has been found that the obtained sludge dried material contains 21.8% by weight of aluminum, 15% by weight of calcium, 2.1% by weight of magnesium, and 9.5% by weight of silicon.

Then, the sludge dried material was mixed in an amount of 20% by weight into commercially available polylactic acid which is a biodegradable resin, and the resultant mixture was shaped by means of a hot press to obtain a resin plate in a sheet form.

EXAMPLE 17

A sludge dried material obtained by dehydrating mixed raw sludge discharged from a sewage disposal plant was added in an amount of 10% by weight to the same commercially available polylactic acid as that used in Example 16, and the resultant mixture was shaped by means of a hot press to obtain a resin plate in a sheet form. As a result of analysis, it has been found that the above sludge dried material contains 9.7% of a fiber component comprised of, for example, an organic fiber of food or a fiber of paper, and 1.2% of a phosphorus component.

EXAMPLE 18

The sludge dried materials in Examples 16 and 17 were added in a respective amount of 10% by weight to the same commercially available polylactic acid as that used in Example 16, and the resultant mixture was shaped by means of a hot press to obtain a resin plate in a sheet form.

Comparative Example 16

In Comparative Example 16, the same commercially available polylactic acid as that used in each of Examples 16 to 18, which is a biodegradable resin, was used and no sludge dried material was added, and shaped by means of a hot press to obtain a resin plate in a sheet form.

With respect to each of the resin plates obtained in Examples 16 to 18 and Comparative Example 16, a surface resistance (JIS C 2318), flammability (UL-Subject 94 HB method), and an Izod impact strength (JIS K 7110) were measured, and the results are shown in Table 3.

TABLE 3

|  | Comparative Example 16 | Example 16 | Example 17 | Example 18 |
|---|---|---|---|---|
| Surface resistance (Ω) | $6 \times 10^{13}$ | $2 \times 10^{11}$ | $2 \times 10^{13}$ | $3 \times 10^{12}$ |
| Flammability | HB or less | HB | HB or less | HB |
| Izod impact strength (kgf · cm/cm) | 2.7 | 3.3 | 4.2 | 3.5 |

As can be seen from Table 3, it has been found that, by adding to a biodegradable resin inorganic sludge discharged from a semiconductor plant, the resin is remarkably improved in electrical properties, such as a surface resistance, and flame retardancy, and, on the other hand, by adding to a biodegradable resin organic sludge discharged from a sewage disposal plant, the resin is improved in mechanical properties.

EXAMPLE 19

The sludge dried material obtained in Example 16 was mixed in an amount of 30% by weight into a commercially available aliphatic polyester (dehydration-condensation product of a diol and a dicarboxylic acid) which is a biodegradable resin, and the resultant mixture was shaped by means of a hot press to obtain a resin plate in a sheet form.

EXAMPLE 20

The sludge dried material used in Example 17 was added in an amount of 15% by weight to the same commercially available aliphatic polyester as that used in Example 19, and the resultant mixture was shaped by means of a hot press to obtain a resin plate in a sheet form.

EXAMPLE 21

The sludge dried materials in Examples 16 and 17 were added in a respective amount of 15% by weight to the same commercially available aliphatic polyester as that used in Example 19, and the resultant mixture was shaped by means of a hot press to obtain a resin plate in a sheet form.

Comparative Example 17

In Comparative Example 17, the same commercially available aliphatic polyester as that used in each of Examples 19 to 21, which is a biodegradable resin, was used and no sludge dried material was added, and shaped by means of a hot press to obtain a resin plate in a sheet form.

With respect to each of the resin plates obtained in Examples 19 to 21 and Comparative Example 17, an Izod impact strength (kgf·cm/cm) and a modulus in flexure (kg/m$^2$) in an atmosphere at 23° C. and a biodegradation rate (%) 16 weeks after being placed in earth were measured, and the results are shown in Table 4.

TABLE 4

|  | Comparative Example 17 | Example 19 | Example 20 | Example 21 |
|---|---|---|---|---|
| Izod impact strength (kgf · cm/cm) | 30 | 35 | 48 | 39 |

TABLE 4-continued

|  | Comparative Example 17 | Example 19 | Example 20 | Example 21 |
|---|---|---|---|---|
| Modulus in flexure (kg/m$^2$) | 70 | 275 | 230 | 250 |
| Biodegradation rate (%) | 45 | 52 | 68 | 62 |

As can be seen from Table 4, it has been found that, by adding a sludge dried material to a biodegradable resin, the resin is remarkably improved in mechanical properties (such as an impact resistance and a modulus) and biodegradability.

Thus, by the present invention, a biodegradable resin composition comprising a biodegradable resin having excellent performance and a resin shaped article of the above biodegradable resin composition can be obtained effectively utilizing sludge which has conventionally been discharged as waste.

Further, the present invention can not only provide a biodegradable resin composition having excellent performance and a shaped article thereof but also reduce the waste discharged and achieve the effective utilization of waste, thus making it possible to contribute to the preservation of the environment.

What is claimed is:

1. A method for imparting flame retardancy to a resin, said method comprising adding a flame retardant for resin to a resin component, wherein said flame retardant comprises a sludge component; and wherein said resin component is derived from a waste plastic.

2. The method according to claim 1, wherein said flame retardant for resin is a flame retardant for resin comprising an inorganic sludge component.

3. The method according to claim 2, wherein said flame retardant for resin is a flame retardant for resin comprising an inorganic sludge component which contains at least one element selected from the group consisting of aluminum, calcium, iron, silicon, magnesium, titanium, antimony, chlorine, and fluorine.

4. The method according to claim 1, wherein said flame retardant for resin is a flame retardant for resin comprising an organic sludge component.

5. The method according to claim 4, wherein said flame retardant for resin is a flame retardant for resin comprising an organic sludge component which contains at least one element selected from the group consisting of phosphorus and nitrogen.

* * * * *